(12) United States Patent
Huth et al.

(10) Patent No.: US 10,570,879 B2
(45) Date of Patent: Feb. 25, 2020

(54) JOINT ASSEMBLY FOR A WIND TURBINE ROTOR BLADE WITH FLANGED BUSHINGS

(71) Applicant: General Electric Company, Schenectady, NY (US)

(72) Inventors: Scott Jacob Huth, Greenville, SC (US); Donald Joseph Kasperski, Simpsonville, SC (US); Aaron A. Yarbrough, Greenville, SC (US); Eric Michael Shain, Simpsonville, SC (US); Jacob Lee Bunch, Spartanburg, SC (US)

(73) Assignee: General Electric Company, Schenectady, NY (US)

( * ) Notice: Subject to any disclaimer, the term of this patent is extended or adjusted under 35 U.S.C. 154(b) by 163 days.

(21) Appl. No.: 15/602,698

(22) Filed: May 23, 2017

(65) Prior Publication Data

US 2018/0340510 A1    Nov. 29, 2018

(51) Int. Cl.
  *F01D 1/06*    (2006.01)
  *F03D 1/06*    (2006.01)
  *F03D 80/30*   (2016.01)

(52) U.S. Cl.
  CPC ............ *F03D 1/0675* (2013.01); *F03D 80/30* (2016.05); *F05B 2230/604* (2013.01); *F05B 2240/302* (2013.01); *F05B 2240/50* (2013.01)

(58) Field of Classification Search
  CPC ................ F03D 1/0675; F03D 1/0683; F05B 2230/604; F05B 2240/302; F05B 2260/30
  See application file for complete search history.

(56) References Cited

U.S. PATENT DOCUMENTS

| 2,503,450 A | 4/1950 | Nebesar |
| 3,771,748 A | 11/1973 | Jones |

(Continued)

FOREIGN PATENT DOCUMENTS

| DE | 102014118004 B3 | 3/2016 |
| EP | 2390498 A1 | 11/2011 |

(Continued)

OTHER PUBLICATIONS

International Search Report and Written Opinion issued in connection with corresponding PCT Application No. PCT/US2018/032177 dated Sep. 18, 2018.

*Primary Examiner* — Ninh H. Nguyen
(74) *Attorney, Agent, or Firm* — Dority & Manning, P.A.

(57) ABSTRACT

A joint assembly for a wind turbine rotor blade includes a male structural member extending longitudinally through female structural members configured with a plurality of rotor blade segments. The female structural member includes first bore holes on opposing sides thereof that are aligned in a chord-wise direction. The male structural member includes second bore holes on opposing sides thereof that are aligned with the first bore holes. At least one chord-wise extending gap is defined between an outer side surface of the male structural member and an inner side surface of the female structural member. A chord-wise extending pin extends through the first and second bore holes to join the male and female structural members. At least one flanged bushing is arranged in the first and second bore holes such that a flange of the bushing extends within the chord-wise extending gap.

16 Claims, 6 Drawing Sheets

(56) References Cited

U.S. PATENT DOCUMENTS

| | | |
|---|---|---|
| 4,130,380 A | 12/1978 | Kaiser |
| 4,643,646 A | 2/1987 | Hahn et al. |
| 4,671,470 A | 6/1987 | Jonas |
| 5,476,704 A | 12/1995 | Kohler |
| 6,234,423 B1 | 5/2001 | Hirahara et al. |
| 6,513,757 B1 | 2/2003 | Amaoka et al. |
| 6,520,706 B1 | 2/2003 | McKague, Jr. et al. |
| 6,800,956 B2 | 10/2004 | Bartlett |
| 6,945,727 B2 | 9/2005 | Christman et al. |
| 6,964,723 B2 | 11/2005 | Lindsay et al. |
| 7,037,568 B1 | 5/2006 | Rogers et al. |
| 7,179,059 B2 | 2/2007 | Sorensen et al. |
| 7,244,487 B2 | 7/2007 | Brantley et al. |
| 7,258,828 B2 | 8/2007 | Fish |
| 7,371,304 B2 | 5/2008 | Christman et al. |
| 7,393,488 B2 | 7/2008 | Grose et al. |
| 7,427,189 B2 | 9/2008 | Eyb |
| 7,470,114 B2 | 12/2008 | Bonnet |
| 7,625,623 B2 | 12/2009 | Grose et al. |
| 7,810,757 B2 | 10/2010 | Kirkwood et al. |
| 7,841,835 B2 | 11/2010 | Bagepalli et al. |
| 7,854,594 B2 * | 12/2010 | Judge ............... B29C 66/124 416/226 |
| 7,897,095 B2 | 3/2011 | Raeckers |
| 7,976,282 B2 | 7/2011 | Livingston et al. |
| 7,997,874 B2 | 8/2011 | van der Bos |
| 8,075,275 B2 | 12/2011 | Althoff et al. |
| 8,167,569 B2 | 5/2012 | Livingston |
| 8,172,538 B2 | 5/2012 | Hancock et al. |
| 8,221,085 B2 * | 7/2012 | Livingston ............ B29C 65/54 156/291 |
| 8,393,871 B2 | 3/2013 | Yarbrough |
| 8,449,259 B1 | 5/2013 | Kaser |
| 8,562,296 B2 | 10/2013 | Arocena De La Rua et al. |
| 8,896,980 B2 | 11/2014 | Kristensen et al. |
| 9,051,921 B2 | 6/2015 | Arocena De La Rua et al. |
| 2003/0037867 A1 | 2/2003 | Bersuch et al. |
| 2006/0225278 A1 | 10/2006 | Lin et al. |
| 2007/0036659 A1 | 2/2007 | Hibbard |
| 2007/0110584 A1 | 5/2007 | Stommel |
| 2009/0087318 A1 | 4/2009 | Althoff et al. |
| 2009/0208701 A1 | 8/2009 | Grose et al. |
| 2010/0135815 A1 | 6/2010 | Bagepalli et al. |
| 2010/0135817 A1 | 6/2010 | Wirt et al. |
| 2010/0143143 A1 | 6/2010 | Judge |
| 2010/0162567 A1 | 7/2010 | Kirkwood et al. |
| 2011/0008175 A1 | 1/2011 | Gau |
| 2011/0020126 A1 | 1/2011 | Glenn et al. |
| 2011/0081247 A1 | 4/2011 | Hibbard |
| 2011/0091326 A1 | 4/2011 | Hancock |
| 2011/0142663 A1 | 6/2011 | Gill |
| 2011/0158788 A1 * | 6/2011 | Bech ............... F03D 1/0675 415/1 |
| 2011/0176928 A1 | 7/2011 | Jensen |
| 2012/0027594 A1 | 2/2012 | Lewke et al. |
| 2012/0027610 A1 | 2/2012 | Yarbrough |
| 2012/0027613 A1 | 2/2012 | Yarbrough |
| 2012/0027614 A1 | 2/2012 | Yarbrough |
| 2012/0027615 A1 | 2/2012 | Irizarry-Rosado et al. |
| 2013/0224032 A1 * | 8/2013 | Busbey ............. F03D 1/0633 416/223 R |
| 2015/0292477 A1 | 10/2015 | Kratmann et al. |
| 2015/0369211 A1 | 12/2015 | Merzhaeuser |
| 2016/0163415 A1 | 6/2016 | Wallenius et al. |
| 2016/0195060 A1 | 7/2016 | Akhtar et al. |
| 2016/0298608 A1 | 10/2016 | Whitehouse et al. |

FOREIGN PATENT DOCUMENTS

| | | |
|---|---|---|
| WO | WO2001/46582 A2 | 6/2001 |
| WO | WO2005/064156 A1 | 7/2005 |
| WO | WO2009/130467 A2 | 10/2009 |
| WO | WO2009/135902 A2 | 11/2009 |
| WO | WO2009/155920 A1 | 12/2009 |

* cited by examiner

JOINT ASSEMBLY FOR A WIND TURBINE ROTOR BLADE WITH FLANGED BUSHINGS

FIELD OF THE INVENTION

The present invention relates generally to wind turbine rotor blades, and more particularly to joint assemblies for wind turbine rotor blades having flanged bushings.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known airfoil principles and transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The construction of a modern rotor blade generally includes skin or shell components, spar caps, and one or more shear webs extending between opposing spar caps. The skin, typically manufactured from layers of fiber composite and a lightweight core material, forms the exterior aerodynamic airfoil shape of the rotor blade. Further, the spar caps provide increased rotor blade strength by integrating one or more structural elements running along the length of the rotor blade on both interior sides of the rotor blade. The shear web(s) includes structural beam-like components running essentially perpendicular between the top and bottom spar caps and extend across the interior portion of the rotor blade between the outer skins. The spar caps have typically been constructed from glass fiber reinforced composites, though some larger blades may include spar caps constructed from carbon fiber reinforced composites.

The size, shape, and weight of rotor blades are factors that contribute to energy efficiencies of wind turbines. An increase in rotor blade size increases the energy production of a wind turbine, while a decrease in weight also furthers the efficiency of a wind turbine. Furthermore, as the size of wind turbines increases, particularly the size of the rotor blades, so do the respective costs of manufacturing, transporting, and assembly of the wind turbines. The economic benefits of increased wind turbine sizes must be weighed against these factors.

One known strategy for reducing the costs of pre-forming, transporting, and erecting wind turbines having rotor blades of increasing sizes is to manufacture the rotor blades in blade segments. The blade segments may be assembled to form the rotor blade after, for example, the individual blade segments are transported to an erection location. For example, some rotor blades include either bonded or bolted joints. One such bolted joint includes a chord-wise extending pin securing a male shear web member or spar member within a female shear web member so as to join adjacent blade segments.

However, certain issues are associated with the chord-wise extending pin. For example, the edge loading of the joint without pin contact is indefinite. Further, the chord-wise extending pin and any other pins needed to secure the joint together, however, may require bushings. During operation of the wind turbine, such bushings may experience walk-out from its bore hole, thereby causing the joint to become loosened over time.

Thus, there is a need for a joint assembly for a segmented rotor blade that addresses the aforementioned issued. Accordingly, the present disclosure is directed to a joint assembly for wind turbine rotor blades having flanged bushings.

BRIEF DESCRIPTION OF THE INVENTION

The present invention provides an improved wind turbine rotor blade design that addresses the considerations discussed above. Additional aspects and advantages of the invention may be set forth in part in the following description, or may be obvious from the description, or may be learned through practice of the invention.

In one aspect, the present disclosure is directed to a rotor blade for a wind turbine. The rotor blade includes a plurality of individual rotor blade segments. Each of the plurality of rotor blade segments includes a female structural member extending longitudinally from a first end to a second end of each of the rotor blade segments. The female structural member includes first bore holes on opposing sides thereof that are aligned in a chord-wise direction. The rotor blade also includes a male structural member extending longitudinally through the female structural members of each of the rotor blade segments such that the plurality of rotor blade segments are aligned and connected end to end on the male structural member. The male structural member includes second bore holes on opposing sides thereof that are aligned with the first bore holes. Further, at least one chord-wise extending gap is defined between an outer side surface of the male structural member and an inner side surface of the female structural member. Moreover, the rotor blade includes at least chord-wise extending pin extending through the first and second bore holes so as to join the male structural member and the female structural member. In addition, the rotor blade includes at least one flanged bushing arranged in at least one of the first bore holes or the second bore holes, wherein a flange of the flanged bushing extends within the chord-wise extending gap.

In one embodiment, opposing chord-wise extending gaps are defined between outer side surfaces of the male structural member and inner side surfaces of the female structural member. Thus, in certain embodiments, the rotor blade further includes first flanged bushings arranged within the first bore holes and second flanged bushings arranged within the second bore holes.

In another embodiment flanges of the first flanged bushings and flanges of second flanged bushings contact each other so as to fill the opposing chord-wise extending gaps. More specifically, in one embodiment, the flanges of the first flanged bushings and the flanges of second flanged bushings are bonded together.

In further embodiments, the second flanged bushings may include opposing open ends. In such embodiments, opposing ends of the chord-wise extending pin are configured to extend through the opposing open ends of the second flanged bushing.

In additional embodiments, the first flanged bushings may include a closed end opposite an open flanged end. In such embodiments, opposing ends of the chord-wise extending pin are configured to abut against the closed ends of the first flanged bushings.

In several embodiments, the flanged bushing(s) may include internal threads. Thus, in particular embodiments, the chord-wise extending pin may be engaged with the internal threads.

In yet another embodiment, the rotor blade may also include a filler material within at least one of the first flanged bushings or the second flanged bushings so as to prevent arcing between the chord-wise extending pin and the first and second flanges bushings.

In another aspect, the present disclosure is directed to a joint assembly for joining a plurality of rotor blade segments of a rotor blade of a wind turbine. The joint assembly includes a female structural member configured with each of the plurality of rotor blade segments. The female structural member includes first bore holes on opposing sides thereof, with the first bore holes being aligned in a chord-wise direction. The joint assembly also includes a male structural member extending longitudinally through the female structural members of each of the rotor blade segments. The male structural member includes second bore holes on opposing sides thereof, with the second bore holes being aligned with the first bore holes. Further, at least one chord-wise extending gap is defined between an outer side surface of the male structural member and an inner side surface of the female structural member. Moreover, the joint assembly includes at least chord-wise extending pin extending through the first and second bore holes so as to join the male structural member and the female structural member. In addition, the joint assembly includes at least one flanged bushing arranged in at least one of the first bore holes or the second bore holes, wherein a flange of the flanged bushing extends within the chord-wise extending gap. It should be understood that the joint assembly may further include any of the additional features and/or embodiments described herein.

In yet another aspect, the present disclosure is directed to a method for joining a plurality of rotor blade segments, the plurality of rotor blade segments each having a female structural member configured therein. The method includes inserting a male structural member through aligned female structural members of the plurality of rotor blade segments such that opposing chord-wise extending gaps are defined between outer side surfaces of the male structural member and inner side surfaces of the female structural members. Further, the method includes arranging first flanged bushings within first bore holes of the female structural members and second flanged bushings within second bore holes of the male structural member such that flanges of the first and second flanged bushings contact each other and fill the opposing chord-wise extending gaps. In addition, the method includes inserting at least one chord-wise extending pin through the first and second flanged bushings.

In one embodiment, the method may further include filling at least one of the first flanged bushings or the second flanged bushings with a filler material so as to fill a gap between the corresponding bushing and the chord-wise extending pin and electrically connecting the first or second flanged bushings to a lightning protection system of the wind turbine. As such, the filler material is configured to prevent arcing in the joint assembly. It should be understood that the method may further include any of the additional steps, features and/or embodiments described herein.

These and other features, aspects and advantages of the present invention will become better understood with reference to the following description and appended claims. The accompanying drawings, which are incorporated in and constitute a part of this specification, illustrate the embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
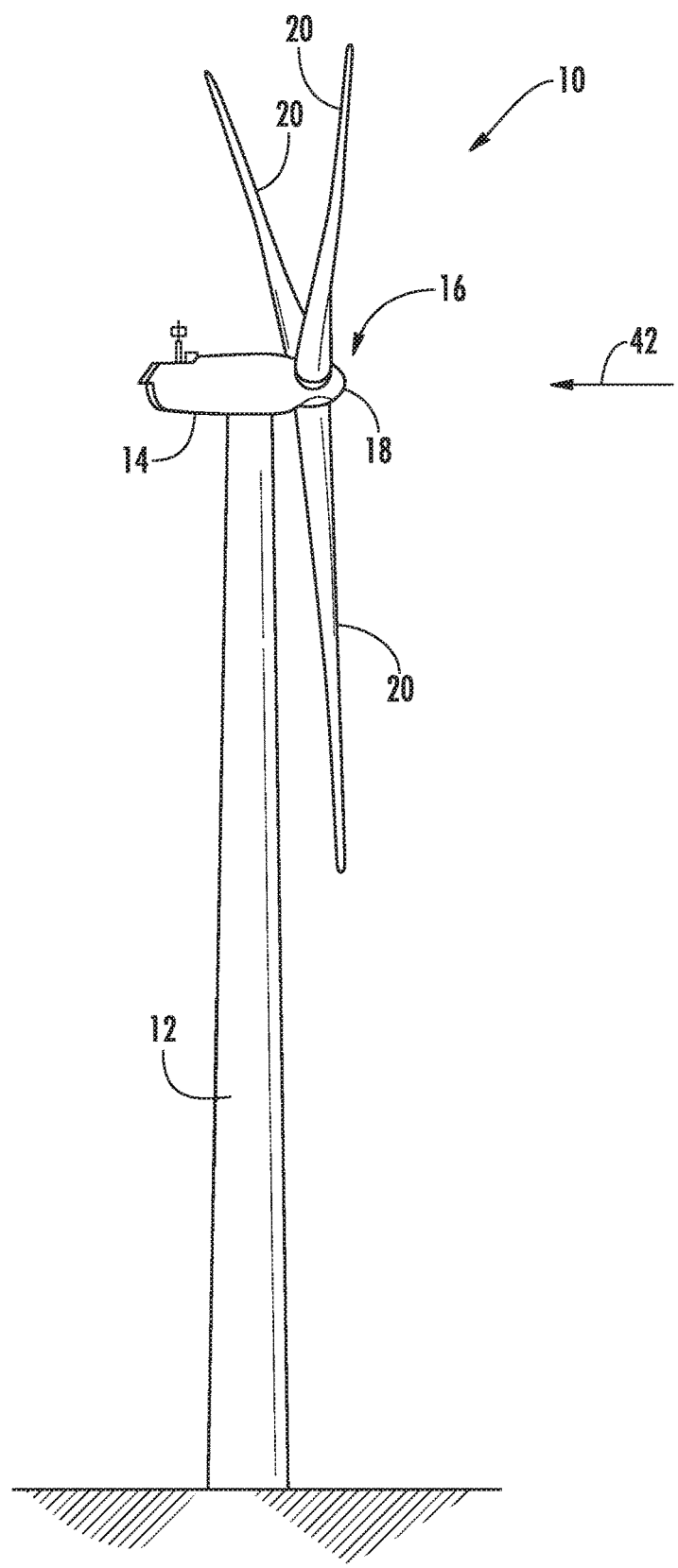
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to a joint assembly for a wind turbine rotor blade that includes a male structural member extending longitudinally through female structural members configured with a plurality of rotor blade segments. The female structural member includes first bore holes on opposing sides thereof that are aligned in a chord-wise direction. The male structural member includes second bore holes on opposing sides thereof that are aligned with the first bore holes. At least one chord-wise extending gap is defined between an outer side surface of the male structural member and an inner side surface of the female structural member. A chord-wise extending pin extends through the first and second bore holes to join the male and female structural members. At least one flanged bushing is arranged in the first and second bore holes such that a flange of the bushing extends within the chord-wise extending gap.

As such, the present disclosure provides many advantages not present in the prior art. For example, edge loading in the joint without pin contact is indefinite. As such, the joint assembly of the present disclosure provides a way to react out edge loads via contact between the pins that is definite. Further, as conventional bushings tend to walk out bore holes, the present disclosure provides flanged bushings arranged within the chord-wise extending gaps between the male and female structural members that serve as a retention feature for the joint assembly. In addition, the male and female structural members are sized to have tighter tolerances than traditional rotor blades, therefore, the flanged bushings are arranged in the gaps and forced to have contact with each other, thereby allowing the bushings to be oversized and then machined to fit at assembly such that a tight tolerance can be maintained. Additional advantages include providing a jointed rotor blade that creates a smaller envelope for transportation, thereby reducing associated costs. Such a rotor blade can be inexpensively assembled in the field without composite work.

Referring now to the drawings, FIG. 1 illustrates a perspective view of one embodiment of a wind turbine 10. As shown, the wind turbine 10 generally includes a tower 12, a nacelle 14 mounted on the tower 12, and a rotor 16 coupled to the nacelle 14. The rotor 16 includes a rotatable hub 18 and at least one rotor blade 20 coupled to and extending outwardly from the hub 18. For example, in the illustrated embodiment, the rotor 16 includes three rotor blades 20. However, in an alternative embodiment, the rotor 16 may include more or less than three rotor blades 20. Each rotor blade 20 may be spaced about the hub 18 to facilitate rotating the rotor 16 to enable kinetic energy to be transferred from the wind into usable mechanical energy, and subsequently, electrical energy. For instance, the hub 18 may be rotatably coupled to an electric generator (not shown) positioned within the nacelle 14 to permit electrical energy to be produced.

Figure 2:
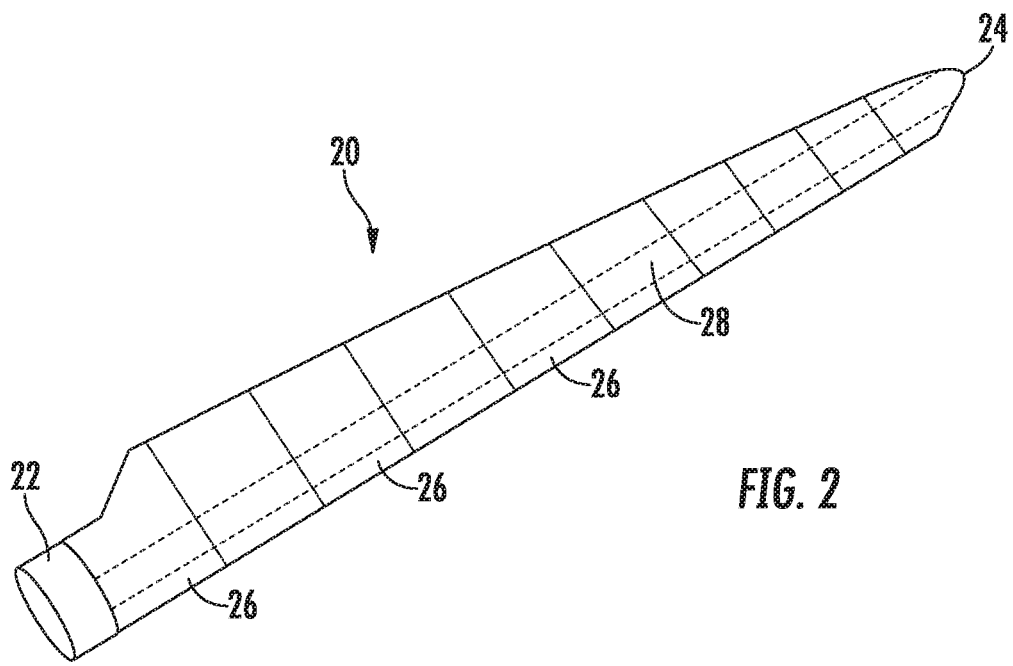
FIG. 2 illustrates a perspective view of one embodiment of a segmented rotor blade of the wind turbine according to the present disclosure.

Referring now to FIG. 2, a perspective view of one of the rotor blades 20 of the wind turbine 10 of FIG. 1 is illustrated. As shown, the rotor blade 20 includes a blade root 22 which is used to mount the rotor blade 20 to the hub 18 and a blade tip 24 opposite the blade root 22. Further, as shown, the body section of the rotor blade 20 includes a plurality of individual blade segments 26 aligned in an end-to-end order from the blade root 22 to the blade tip 24. As such, each of the individual blade segments 26 may be uniquely configured so that the plurality of segments 26 define the complete rotor blade 20 having the designed blade profile, length, and other desired characteristics. Thus, the rotor blade 20 may have a swept shape giving it a curved contour running from the blade root 22 to the blade tip 24. Alternatively, the segmented rotor blade 10 may have a non-swept shape. Further, the longitudinal end faces of the individual blade segments 26 may have a profile so as to align with the end face of an adjacent blade segment.

Figure 3:
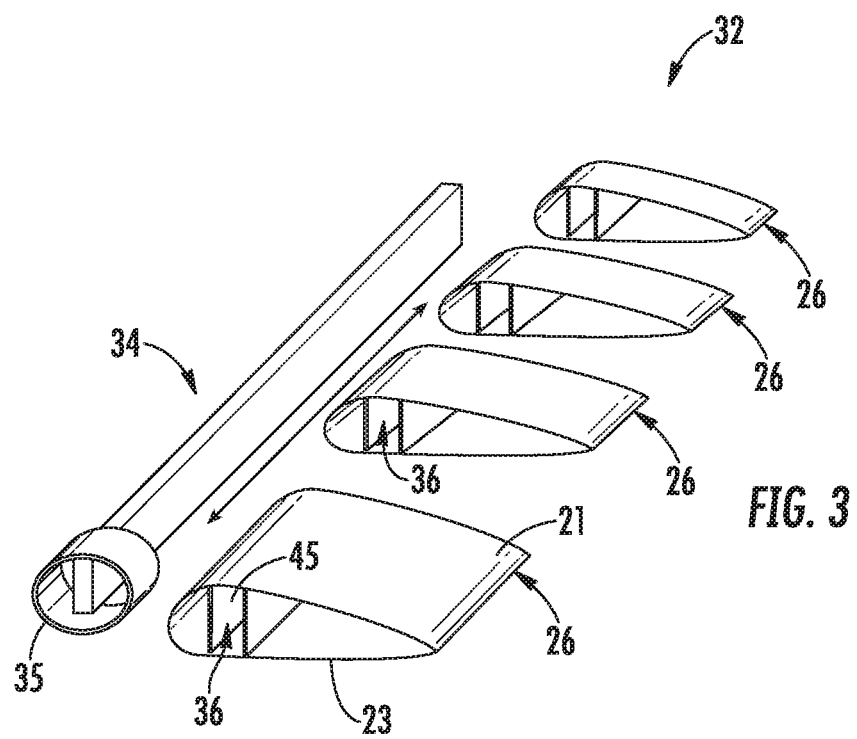
FIG. 3 illustrates a partial component view of one embodiment of a segmented wind turbine blade according to the present disclosure.
Figure 4:
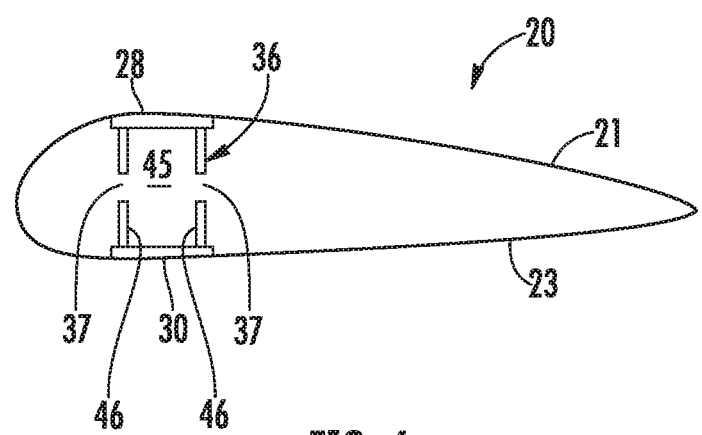
FIG. 4 illustrates a cross-sectional view of one embodiment of a rotor blade segment having a female structural member secured between opposing spar caps of the rotor blade according to the present disclosure.

In addition, as shown in FIGS. 3 and 4, each of the individual blade segments 26 may be formed from a first shell component 21 and a second shell component 23. Such shell components 21, 23 may be individually formed and joined together at the leading and trailing edges of the rotor blade 20. The individual shell components 21, 23 may each include an inner and outer skin, and may be constructed, for example, from a dry fibrous material. In addition, each of the shell components 21, 23 may include a core material sandwiched between the inner and outer skins. This core material may be, for example, a lightweight material, such as balsa wood, extruded polystyrene foam, or the like, as is known in the art.

Figure 6:
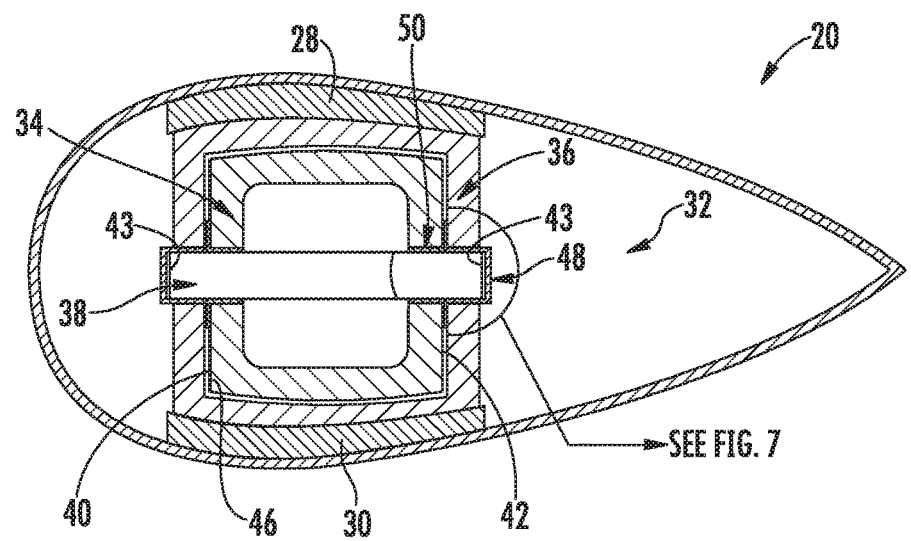
FIG. 6 illustrates a cross-sectional view of one embodiment of a joint assembly for a rotor blade according to the present disclosure, particularly illustrating a male structural member secured within a female structural member via a chord-wise extending pin with flanged bushings retaining the pin in place.

In further embodiments, the rotor blade 22 may also include any manner of internal structural components or other support webs between the upper and lower shell components 21, 23 of the blade segments 26. For example, as shown in FIGS. 2, 4, and 6, the rotor blade 20 may include spar caps 28, 30 extending along substantially the full longitudinal length of the rotor blade 20 and are bonded to an inner skin or surface of the rotor blade 20. Further, as shown, the spar caps 28, 30 may have a shape and curvature that essentially matches the shape and curvature of the internal skins of the respective shell components 21, 23 or any additional internal web adhered to the inner skin surfaces.

Figure 7:
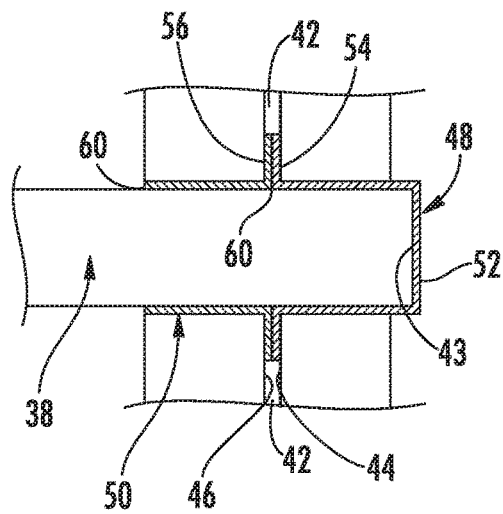
FIG. 7 illustrates a detailed, cross-sectional view of part of the joint assembly of FIG. 6.

Referring particularly to FIGS. 3 and 6-7, the rotor blade 20 may also include a joint assembly 32 formed by a longitudinally extending rigid male structural member 34 that extends through a female structural member 36. For example, in one embodiment, the male structural member 34 may form part of a shear web of the rotor blade 20 as well as part of the spar caps thereof 28, 30. Further, as shown, the female structural member 36 forms part of the shear web as well. Thus, as shown, the joint assembly 32 provides structural integrity to the rotor blade 20 (i.e. by acting as the shear web between opposing spar caps 28, 30) and joins adjacent rotor blade segments 26 together as described herein.

More specifically, as shown in FIG. 3, each of the rotor blade segments 26 includes the female structural member 36 extending longitudinally from a first end to a second end of each of the rotor blade segments 26. Further, as shown, the female structural members 36 each define an internal passageway 45. Moreover, as shown, the female structural member 36 has a certain keyed profile that corresponds or matches the cross-sectional profile of the male structural member 34. In addition, the female structural member 36 may be adhered to the inner skins of the shell components 21, 23 using any suitable adhesive material or bonding method. For example, the female structural member 36 may be attached directly to the inner skin surfaces of the shell components 21, 23 or may be attached to a separate web that is adhered to the inner skin surfaces for added support and rigidity.

In addition, as shown, the male structural member 34 extends from a first longitudinal end to a second longitudinal end of each blade segment 26 and has a particular cross-sectional profile that generally corresponds to the cross-sectional shape of the internal passageways 45 of the female structural member 36. Further, as shown in FIG. 3, the male structural member 34 may include a root ring 35 for attaching the rotor blade 20 to the hub 18. In addition, the blade segments 26 may be connected or affixed to the male structural member 34 by any conventional attaching means. For example, in one embodiment, the blade segments 26 may be bonded to the male structural member 34.

Figure 5:
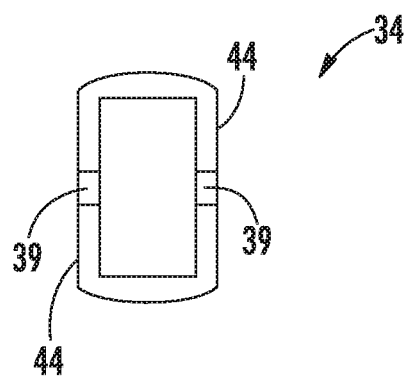
FIG. 5 illustrates a cross-sectional view of one embodiment of male structural member that fits within a female structural member according to the present disclosure.

It should be understood that the male and female structural members 34, 36 may take on various shapes and configurations. For example, as shown generally in FIGS. 5-7, the male structural member 34 is a hollow box beam structure. Similarly, as shown in FIGS. 3, 4, and 6, the internal passageways 45 of the female structural members 36 have a generally box-like cross-sectional profile that corresponds to the generally hollow box beam structure of the male structural member 34. More specifically, as shown, the male structural member 34 may have a hollow square or rectangular configuration, with the spar caps defined by opposite sides of the box beam structure. In alternate embodiments, as shown in FIG. 5, the male structural member 34 may have a hollow beam structure with concave or convex walls extending between the spar caps 28, 30. Thus, the individual blade segments 26 are connected together in an end-to-end configuration on the male structural member 34 to define the complete segmented rotor blade 20 depicted in FIG. 2.

The male and female structural members 34, 36 may be formed of any suitable material conventionally used as internal shear webs for wind turbine blades. For example, the male and/or female structural members 34, 36 may be formed of a carbon fiber reinforced matrix or a glass fiber reinforced polymer, or other strong, light-weight material.

Referring now to FIGS. 4 and 6-7, the female structural member 36 also includes first bore holes 37 on opposing sides thereof. More specifically, as shown, the first bore holes 37 are aligned in a chord-wise direction. Similarly, as shown in FIGS. 5-7, the male structural member 34 includes second bore holes 39 on opposing sides thereof that are aligned with the first bore holes 37. Further, as shown in FIGS. 6 and 7, at least one chord-wise extending gap is defined between an outer side surface 46 of the male structural member 34 and an inner side surface 44 of the female structural member 36. For example, as shown in the illustrated embodiment, opposing chord-wise extending gaps 40, 42 are defined between outer side surfaces 46 of the male structural member 34 and inner side surfaces 44 of the female structural member 36. Moreover, the joint assembly 32 includes at least chord-wise extending pin 38 extending through the first and second bore holes 37, 39 so as to join the male structural member 34 and the female structural member 36 (and adjacent blade segment 26) together.

In addition, the joint assembly 32 includes at least one flanged bushing 48, 50 arranged in the first and/or second bore holes 37, 39 that receive the pin 38. For example, as shown in FIGS. 6 and 7, the joint assembly 32 includes first flanged bushings 48 arranged within the first bore holes 37 and second flanged bushings 50 arranged within the second bore holes 39. Further, as shown, the flanges 54 of the first flanged bushings 48 and flanges 56 of second flanged bushings 50 contact each other so as to fill the opposing chord-wise extending gaps 40, 42. More specifically, in one embodiment, the flanges 54, 56 of the first and second flanged bushings 48, 50 may be bonded together. Thus, the combination of the flanged bushings 48, 50 that are retained in the gaps 40, 42 and the chord-wise extending pin 38 provides a definite load path for transferring loads. More specifically, by allowing the flanged bushings 48, 50 to react out the edge load, the loading becomes definite and can be designed to. Additionally, since the purpose of the design is to load up the flanged bushings 48, 50 edgewise, the flanged bushings 48, 50 can be machined after assembly to assure minimal gaps during installation. Additionally, as standard bushings may want to walk out (e.g. due to uneven loading in the blade, adhesive failure, etc.), arranging the flanged bushings 48, 50 as shown prevent the bushings from walking out of the bore holes 37, 39.

Figure 8:
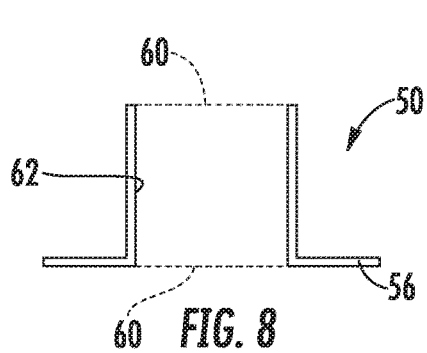
FIG. 8 illustrates a detailed, cross-sectional view of one embodiment of a second flanged bushing according to the present disclosure.
Figure 9:
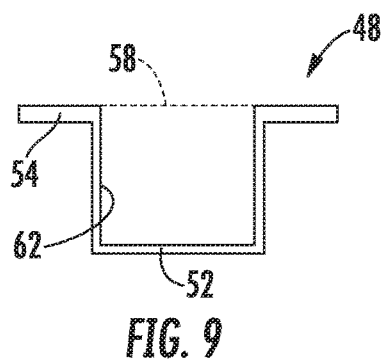
FIG. 9 illustrates a detailed, cross-sectional view of one embodiment of a first flanged bushing according to the present disclosure.

Referring still to FIGS. 6, 7, and 8, the second flanged bushings 50 may include opposing open ends 60. In such embodiments, as shown, opposing ends 43 of the chord-wise extending pin 38 are configured to extend through the opposing open ends 60 of the second flanged bushing 50. In additional embodiments, as shown in FIGS. 6, 7, and 9, the first flanged bushings 48 may include a closed end 52 opposite an open flanged end 58 (i.e. the end containing the flange 54). In such embodiments, opposing ends 43 of the chord-wise extending pin 38 are configured to abut against the closed ends 52 of the first flanged bushings 48.

In several embodiments, as shown in FIGS. 8 and 9, the flanged bushing(s) 48, 50 may include optional internal threads 62. Thus, in such embodiments, the chord-wise extending pin 38 may have corresponding threads that engage the internal threads 62 of the flanged bushing(s) 48, 50.

Figure 10:
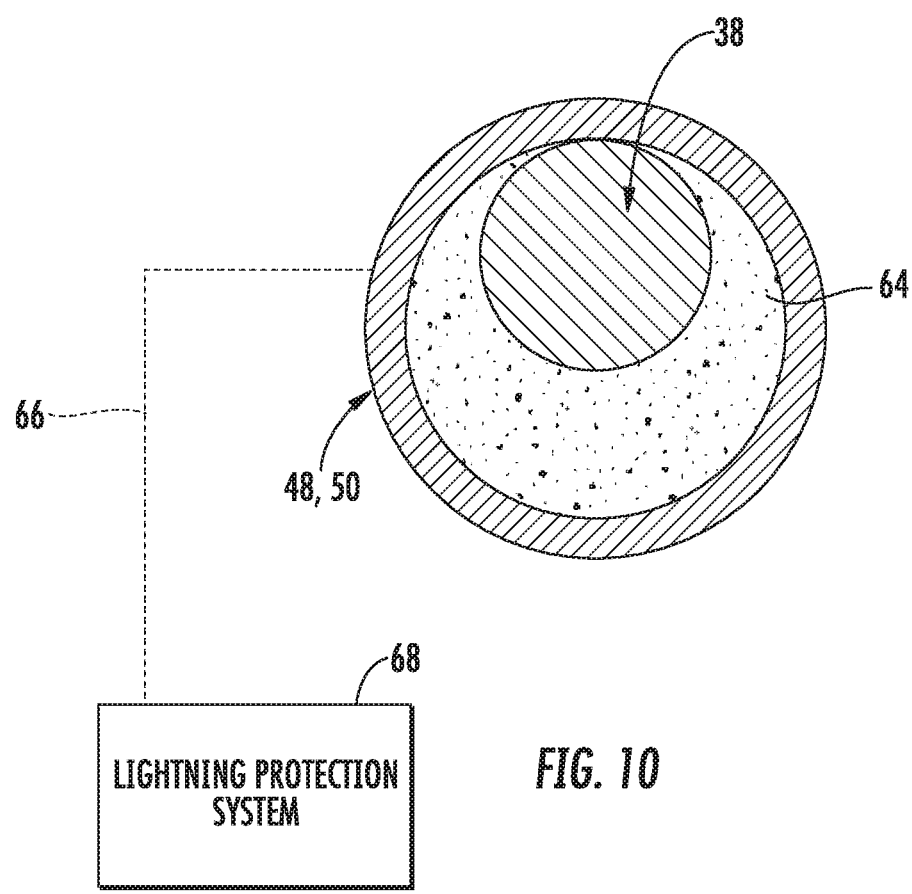
FIG. 10 illustrates a detailed, cross-sectional view of one embodiment of a flanged bushing of a joint assembly receiving a chord-wise extending pin therein according to the present disclosure, particularly illustrating a filler material configured between the pin and the flanged bushing.

Referring now to FIG. 10, the joint assembly 32 may also include a filler material 64 configured within one or both of the first or second flanged bushings 48, 50 i.e. to fill the space between the bushings 48, 50 and the chord-wise extending pin 38 so as to prevent arcing in the joint assembly 32. For example, in certain embodiments, the filler material 64 may include a conductive material, such as carbon foam. Where there is air between metal surfaces, arcing can occur. Therefore, the filler material 64 reduces the risk for such arcing to occur. Further, as shown, the first or second flanged bushings 48, 50 may be electrically connected (e.g. via conductive wire 66) to a lightning protection system 68 of the wind turbine 10.

Figure 11:
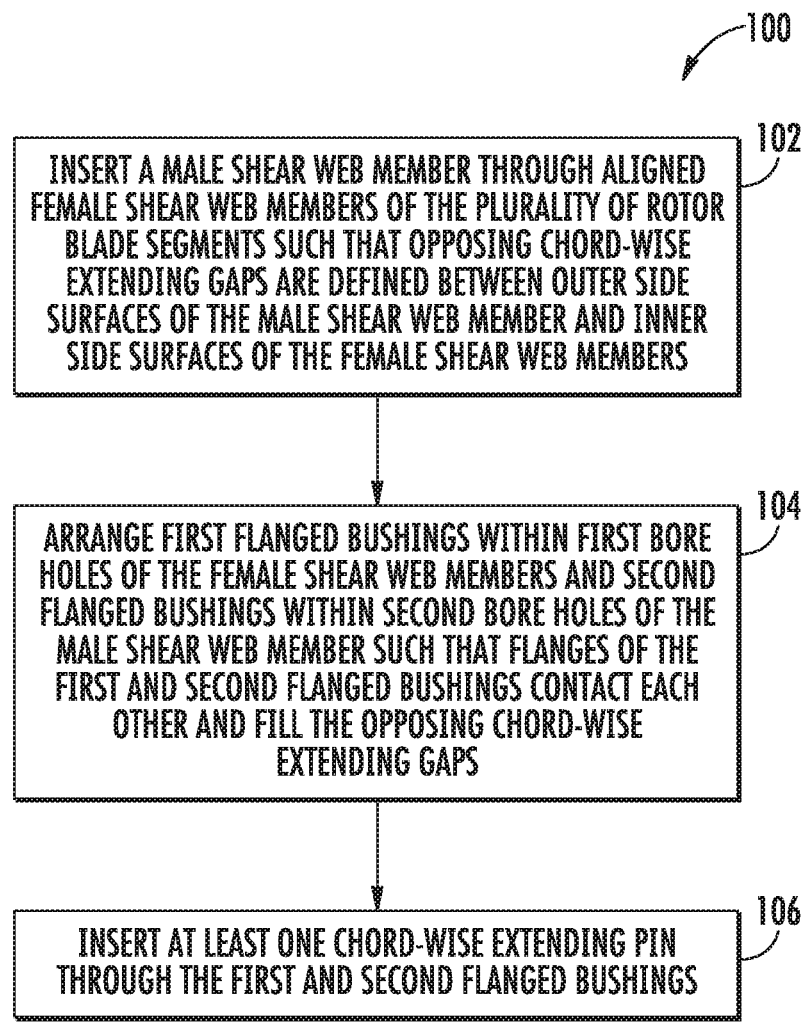
FIG. 11 illustrates a flow diagram of one embodiment of a method for joining a plurality of rotor blade segments according to the present disclosure.

Referring now to FIG. 11, a flow diagram of one embodiment of a method 100 for joining a plurality of rotor blade segments 26 is illustrated. As mentioned, the plurality of rotor blade segments 26 each have a female structural member 36 configured therein. Thus, as shown at 102, the method 100 includes inserting a male structural member 34 through aligned female structural members 36 of the plurality of rotor blade segments 26 such that opposing chord-wise extending gaps 40, 42 are defined between outer side surfaces 46 of the male structural member 34 and inner side surfaces 44 of the female structural members 36. As shown at 104, the method 100 includes arranging first flanged bushings 48 within first bore holes 37 of the female structural members 36 and second flanged bushings 50 within second bore holes 39 of the male structural member 34 such that flanges 54, 56 of the first and second flanged bushings 48, 50 contact each other and fill the opposing chord-wise extending gaps 40, 42. As shown at 106, the method 100 includes inserting at least one chord-wise extending pin 38 through the first and second flanged bushings 48, 50.

In one embodiment, the method 100 may include filling either or both of the first or second flanged bushings 48, 50 with a filler material 64 and electrically connecting the first and second flanged bushings 48, 50 to the lightning protection system 68 of the wind turbine 10, e.g. via the conductive wire 66 (FIG. 10).

Further, the method 100 may include inserting opposing ends 43 of the chord-wise extending pin 38 extend through the opposing open ends 60 of the second flanged bushing 50 and placing the opposing ends 43 of the chord-wise extending pin 38 against the closed ends 52 of the first flanged bushings 48.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade for a wind turbine, comprising:
   a plurality of individual rotor blade segments;
   each of the plurality of rotor blade segments comprising
   a female structural member extending longitudinally from a first end to a second end of each of the rotor blade segments, the female structural member comprising first bore holes on opposing sides thereof, the bore holes aligned in a chord-wise direction;
   a male structural member extending longitudinally through the female structural members of each of the rotor blade segments such that the plurality of rotor blade segments are aligned and connected end to end on the male structural member, the male structural member comprising second bore holes on opposing sides thereof, the second bore holes aligned with the first bore holes, at least one chord-wise extending gap being defined between an outer side surface of the male structural member and an inner side surface of the female structural member;
   at least chord-wise extending pin extending through the first and second bore holes so as to join the male structural member and the female structural member; and,
   first flanged bushing arranged within the first bore holes and second flanged bushings arranged within the second bore holes, wherein a flange of each of the first and second flanged bushings extend within the chord-wise extending gap,
   wherein the first flanged bushings each comprise a closed end opposite an open flanged end, and wherein the opposing ends of the chord-wise extending pin abut against the closed ends of the first flanged bushings.

2. The rotor blade of claim 1, wherein opposing chord-wise extending gaps are defined between outer side surfaces of the male structural member and inner side surfaces of the female structural member.

3. The rotor blade of claim 1, wherein the flanges of the first and second flanged bushings contact each other so as to fill the opposing chord-wise extending gaps.

4. The rotor blade of claim 3, wherein the flanges of the first and second flanged bushings are bonded together.

5. The rotor blade of claim 3, wherein the second flanged bushings each comprise opposing open ends, and wherein opposing ends of the chord-wise extending pin extend through the opposing open ends of the second flanged bushing.

6. The rotor blade of claim 1, wherein at least one of the first flanged bushings or the second flanged bushings comprise internal threads, the chord-wise extending pin being engaged with the internal threads.

7. The rotor blade of claim 1, further comprising a filler material within at least one of the first flanged bushings or the second flanged bushings so as to prevent arcing between the chord-wise extending pin and the first and second flanges bushings.

8. A joint assembly for joining a plurality of rotor blade segments of a rotor blade of a wind turbine, the joint assembly comprising:
   a female structural member configured with each of the plurality of rotor blade segments, the female structural member comprising first bore holes on opposing sides thereof, the bore holes aligned in a chord-wise direction;
   a male structural member extending longitudinally through the female structural members of each of the rotor blade segments, the male structural member comprising second bore holes on opposing sides thereof, the second bore holes aligned with the first bore holes at least one chord-wise extending gap being defined between an outer side surface of the male structural member and an inner side surface of the female structural member;
   at least chord-wise extending pin extending through the first and second bore holes so as to join the male structural member and the female structural member; and,
   at least one flanged bushing arranged in at least one of the first bore holes or the second bore holes, wherein a flange of the flanged bushing extends within the chord-wise extending gap, the at least one flanged bushing comprising internal threads, the chord-wise extending pin being engaged with the internal threads.

9. The joint assembly of claim 8, wherein opposing chord-wise extending gaps are defined between outer side surfaces of the male structural member and inner side surfaces of the female structural member.

10. The joint assembly of claim 9, further comprising first flanged bushings arranged within the first bore holes and second flanged bushings arranged within the second bore holes.

11. The joint assembly of claim 10, wherein flanges of the first flanged bushings and flanges of second flanged bushings contact each other so as to fill the opposing chord-wise extending gaps.

12. The joint assembly of claim 11, wherein the flanges of the first flanged bushings and the flanges of second flanged bushings are bonded together.

13. The joint assembly of claim 11, wherein the second flanged bushings each comprise opposing open ends, and wherein opposing ends of the chord-wise extending pin extend through the opposing open ends of the second flanged bushing.

14. The joint assembly of claim 13, wherein the first flanged bushings each comprise a closed end opposite an open flanged end, and wherein the opposing ends of the chord-wise extending pin abut against the closed ends of the first flanged bushings.

15. The joint assembly of claim 8, further comprising a filler material within at least one of the first flanged bushings or the second flanged bushings so as to prevent arcing between the chord-wise extending pin and the first and second flanges bushings.

16. A method for joining a plurality of rotor blade segments, the plurality of rotor blade segments each having a female structural member configured therein, the method comprising:
   inserting a male structural member through aligned female structural members of the plurality of rotor blade segments such that opposing chord-wise extending gaps are defined between outer side surfaces of the male structural member and inner side surfaces of the female structural members;
   arranging first flanged bushings within first bore holes of the female structural members and second flanged bushings within second bore holes of the male structural member such that flanges of the first and second flanged bushings contact each other and fill the opposing chord-wise extending gaps:
   filling at least one of the first flanged bushings or the second flanged bushings with a filler material so as to fill a space between the first flanged bushings or the second flanged bushings and the chord-wise extending pin and electrically connecting the first and second flanged bushings to a lightning protection system of the wind turbine; and, inserting at least one chord-wise extending pin through the first and second flanged bushings.

\* \* \* \* \*